United States Patent [19]

Huang et al.

[11] 3,711,558
[45] Jan. 16, 1973

[54] PROCESS FOR THE PREPARATION OF AROMATIC GLYCOLS

[75] Inventors: Ching Yun Huang, Minoo; Tamostu Maeno, Suita, both of Japan

[73] Assignee: Japan Gas-Chemical Company, Inc., Tokyo, Japan

[22] Filed: July 8, 1970

[21] Appl. No.: 53,257

Related U.S. Application Data

[62] Division of Ser. No. 614,347, Feb. 6, 1967, Pat. No. 3,546,301.

[30] Foreign Application Priority Data

Feb. 10, 1966   Japan ................................. 41/7825

[52] U.S. Cl. ............................................. 260/618 R
[51] Int. Cl. ............................................. C07c 29/00
[58] Field of Search ................................. 260/618 R

[56] References Cited

UNITED STATES PATENTS

| | | | |
|---|---|---|---|
| 2,139,369 | 12/1938 | Kyrides | 260/618 R X |
| 3,150,171 | 9/1964 | Benning et al. | 260/618 R X |
| 3,030,427 | 4/1962 | Earhart et al. | 260/618 R |
| 3,546,301 | 12/1970 | Huang et al. | 260/618 R |

FOREIGN PATENTS OR APPLICATIONS 20,505   4/1914   Great Britain .................... 260/618 R

*Primary Examiner*—Bernard Helfin
*Attorney*—Wenderoth, Lind & Ponack

[57]             ABSTRACT

A process for the preparation of aromatic glycols which comprises saponifying an aromatic hydrocarbon dihalomethyl compound by dispersing said compound as an oily substance or a water-soluble organic solvent solution into an aqueous solution of saponifying agent such as a hydroxide of an alkali metal, by means of tough shearing stirring, to form an oil-in-water emulsion.

5 Claims, 1 Drawing Figure

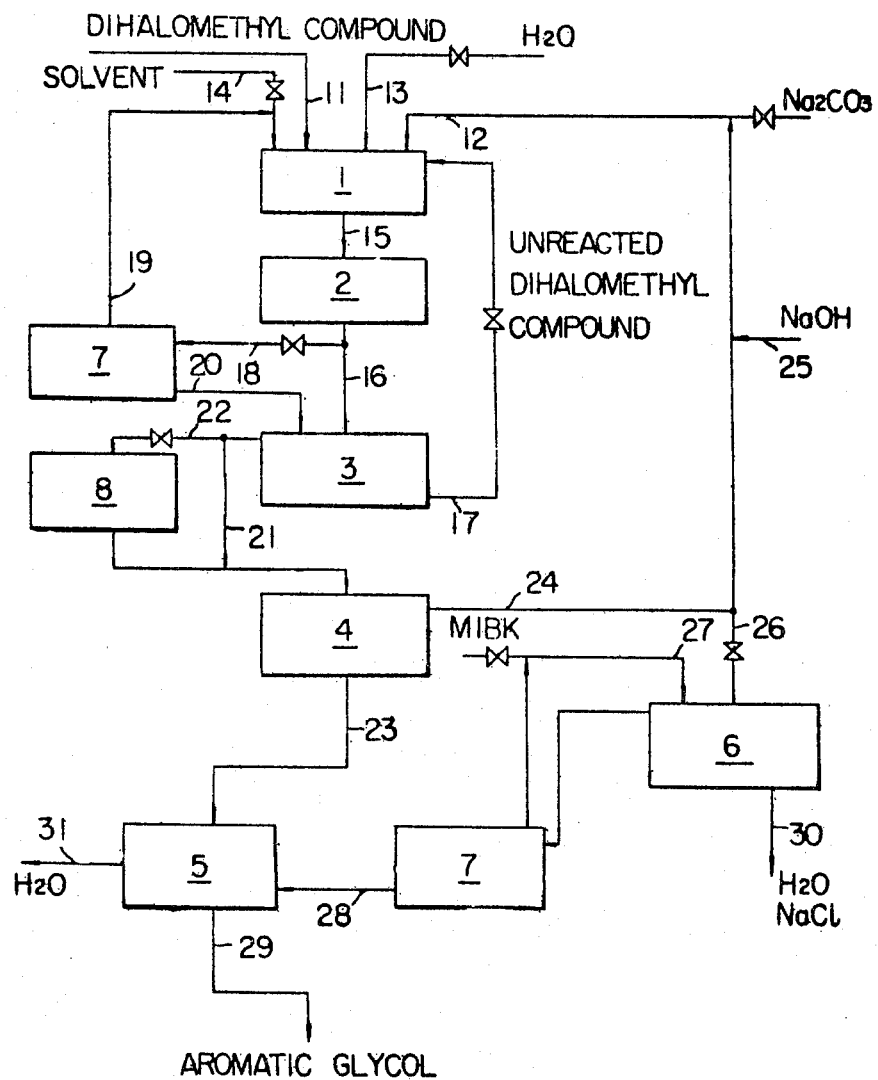

PROCESS FOR THE PREPARATION OF AROMATIC GLYCOLS

This is a divisional application of applicants' copending application Ser. No. 614,347, filed Feb. 6, 1967 and now U.S. Pat. No. 3,546,301.

This invention relates to an improved process of saponifying aromatic dihalomethyl compounds for a short reaction time, thereby preparing the corresponding aromatic glycols at a high yield.

Heretofore, various processes of saponifying a halomethyl group of an aromatic dihalomethyl compound thereby preparing the corresponding glycol have been attempted; however, a process for industrially preparing a high purity aromatic glycol at a high yield has not been known.

As a process conventionally employed, there is a process of heating an aromatic dihalomethyl compound with water under reflux in the presence of a strong base, for instance, caustic soda or caustic potash, or a metal salt of a weak acid, for instance, sodium carbonate or calcium carbonate, to saponify the same to an aromatic glycol [e.g., see R. F. Lindemann and Roland J. Horbath; U. S. Pat. No. 3,029,290 (1962)]. However, according to this process it requires several hours, sometimes a few days until the reaction is completed. Moreover, when an aromatic dihalomethyl compound is treated for a long time in the presence of a strong base, it is normal that a resinous substance whose separation from the objective compound is difficult is produced as a by-product, therefore, this process has a defect that purification of the objective is difficult.

And as an improved process for preventing such defect, there is a process of acting an alkali metal or an alkaline earth metal salt of acetic acid on an aromatic dihalomethyl compound in glacial acetic acid to obtain the corresponding diacetoxymethyl compound, followed by saponification of said diacetoxymethyl compound in the presence of a strong base, for instance, caustic soda or caustic potash to obtain an aromatic glycol [e.g., Chemische Werke Witten G.m.b.H. (Gustav Renckoff and Hans L. Huelsman); German Pat. No. 1,108,677 (1961)].

However, this process is a two-stage reaction, having defects of not only using a reagent not essentially necessary, but that a first stage acetylation requires several hours and an yield at a second stage saponification is mostly low.

On the other hand, an aromatic dihalomethyl compound generally has an appreciable tendency to sublimate, for instance, $\alpha,\alpha'$-halogen substituted xylenes intensely sublimate when heated under atmospheric pressure for a long period, making difficult the reaction.

Therefore, as an improved process for accelerating the reaction thereby eliminating these defects, it has also been proposed to carry out the reaction under pressure, for instance, James E. Pritchard et al. [U. S. Pat. No. 2,939,886 (1960)] carried out the reaction at 135°C. under pressure for accelerating the reaction, using a sealed system to prevent sublimation of p-xylylene dichloride upon reacting p-xylylene dichloride with potassium acetate in water. However, even when the reaction was carried out for 11 hours under said conditions, and then caustic soda was added to saponify the corresponding diacetoxymethyl compound for 1 hour at 80°C., yield of p-xylene glycol was nothing but 84.1 percent.

And Otto Groskinsky et al. [Japanese Pat. application publication No. 18,296/1965] carried out saponification of bis(chloromethyl)-m-xylene in the presence of calcium hydroxide at a high temperature above 120°C. under pressure continuously. Despite the reaction period was remarkably shortened as compared with the conventional process, a residence time of 30 minutes was still necessary, yet the yield remained at 87 percent.

An object of this invention is to provide an improved process for preparing from an aromatic hydrocarbon dihalomethyl compound the corresponding aromatic glycol with a very short reaction period at a reaction temperature lower than 100°C. at a high yield without a super-atmospheric pressure and substantially without a side reaction.

Another object of this invention is to provide a process capable of saponifying an aromatic hydrocarbon dihalomethyl compound very efficiently and continuously, using a small reaction apparatus.

Other objects and advantages of this invention will become apparent from the following description.

Above objects can be achieved by a process for the preparation of aromatic glycols according to this invention which comprises saponifying an aromatic hydrocarbon dihalomethyl compound in aqueous alkaline solution, characterized by dispersing an oily substance or a water-soluble organic solvent solution of said halomethyl compound in an aqueous solution of a hydroxide or a carbonate of an alkali metal or an alkaline earth metal to form an oil-in-water type emulsion.

According to this invention, it has been found that aromatic glycols can be obtained at a high yield of above 90 percent, especially above 95 percent of the theoretical amount within a very short period of at most 15 minutes, normally 2 – 5 minutes by dispersing an aromatic hydrocarbon dihalomethyl compound as an oily substance or as a solution dissolved in a proper solvent, about which mention will be made later, as occasion demands, into an aqueous solution of said saponifier in the form of an oil-in-water type emulsion.

As a material substance usable in this invention anything will do so long as it is an aromatic hydrocarbon dihalomethyl compound. When these compounds are exemplified, there may be cited monocyclic aromatic hydrocarbons such as benzene, toluene, ethylbenzene, o-, m- and p-xylene, mesitylene, pseudocumene, durene and isodurene, or aromatic compounds with condensed nuclei including naphthalene, $\alpha$- and $\beta$-methylnaphthalene and anthracene.

An aromatic hydrocarbon dihalomethyl compound preferably usable in this invention is a compound having the general formula

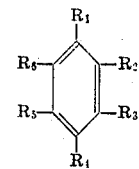

wherein each of $R_1$, $R_2$, $R_3$, $R_4$, $R_5$ and $R_6$ is a group selected from the class consisting of hydrogen, an alkyl group having 1 – 2 carbon atoms and a halomethyl group provided that two groups of the total are halomethyl groups.

Of said compounds, m-xylylene dichloride, p-xylylene dichloride, 4,6-bis(chloromethyl)-m-xylene and 2,5-bis(chloromethyl)-p-xylene, especially 4,6-bis-(chloromethyl)-m-xylene are preferable.

The saponifying agents usable in this invention are hydroxide or carbonate of an alkali metal or an alkaline earth metal. Of these saponifying agents, a carbonate of an alkaline earth metal, for instance, calcium carbonate is hardly water-soluble; however, a very small amount of a dissolved component participates in saponification successively, thereby the reaction proceeds smoothly. Even when a strong base such as caustic soda or caustic potash is used, the reaction proceeds very rapidly at a relatively low temperature, and residence time of the reaction mass in the system is short; therefore, without bringing about a resinous material as by-product as seen in the hitherto employed process, an aromatic dihalomethyl compound is completely saponified to the corresponding aromatic glycol. Accordingly, in general there is no necessity of recovering unreacted material substances and separating by-products, aromatic glycols obtained after the reaction being very high in purity, they may be offered for various uses per se without generally requiring any purification operation.

It is preferable that a saponifying agent is used in an amount of 1 to 2 equivalents based on the material aromatic dihalomethyl compound. Concentration of an aqueous solution of a saponifying agent is preferably in an amount of 0.01 to 0.4 gram equivalent, especially 0.02 to 0.2 gram equivalent per 100 grams of water for smoothly proceeding the reaction.

However, when a carbonate, for instance, sodium carbonate is used, if by neutralizing hydrogen chloride brought about by saponification, once produced sodium bicarbonate further participates in saponification, it is changed to carbonic acid, generating carbon dioxide and sometimes accompanied with a troublesome situation; therefore, in order that the carbonate used may become a bicarbonate thereby completing the reaction, it is preferable to use sodium carbonate in an amount of at least 2 equivalents based on the aromatic dihalomethyl compound. It goes without saying that at this occasion, it is preferable to make concentration of an aqueous solution of a saponifying agent in a range of 0.02 to 0.8 gram equivalent, especially 0.04 to 0.4 gram equivalent per 100 grams of water. It is also preferable to make a using amount based on water of an aromatic dihalomethyl compound 0.005 to 0.2 mol, especially 0.01 to 0.1 mol of said compound based on 100 grams of water.

In this invention, said aromatic hydrocarbon dihalomethyl compound is dispersed in the form of an oily substance or a solution dissolved in a proper solvent, as occasion demands, in an aqueous solution of said saponifying agent. It is preferable to carry out dispersion at a temperature from room temperature to 100°C., preferably 50° to 100°C. At this occasion, when a water-soluble organic solvent is concurrently used, emulsification of the dihalomethyl compound in said aqueous solution is facilitated; thus saponification of said compound is carried out very rapidly, it has been learned. Whether an individual dihalomethyl compound is dispersed in the form of an oily substance or a solution of an organic solvent can be easily decided by a simple experiment depending upon the melting point or other properties of said compound.

For instance, in the case of 4,6-bis(chloromethyl)-m-xylene having a melting point of 98°C., as it becomes oily in an aqueous solution at 95°C.; accordingly, without particularly using a solvent, dispersion becomes possible and a saponification is achieved. On the other hand, in the case of m-xylylene-dichloride having a melting point of 34.5°C., by adding a proper solvent, a saponification is extremely accelerated. And in the case of an aromatic dihalomethyl compound having a melting point of above 100°C., for instance 2,5-bis(chloromethyl)-p-xylene having a melting point of 134°C., it is possible to dissolve the same in a proper solvent to make oily in an aqueous solution of a saponifying agent and enable the same to be emulsified and dispersed at a temperature below 100°C. By this fact using a proper solvent, it becomes possible to sufficiently carry out a reaction of a dihalomethyl compound having a melting point above 100°C. at a temperature from room temperature to 100°C. In general, a temperature of 50° to 100°C. is more preferable.

Also an organic solvent solution of an aromatic dihalomethyl compound may be made by dissolving the same in the organic solvent in advance, or by adding the same and the said solvent individually to the reaction system including an aqueous solution of a saponifying agent to form the solution in situ.

In order to have an aromatic hydrocarbon dihalomethyl compound in accordance with this embodiment dispersed in an aqueous solution in the form of an organic solvent solution, it is not enough that said organic solvent is merely a good solvent for the aromatic dihalomethyl compound, but is is of necessity water-soluble, namely, either it is easily soluble in water or relatively soluble in water. For instance, it has been found that even when said 2,5-bis(chloromethyl)-p-xylene is dissolved in its good solvent of benzene and emulsified and dispersed in an aqueous solution, the saponification is not completely carried out.

As proper solvents, ketones such as acetone and methyl ethyl ketone, and ethers such as tetrahydrofuran, tetrahydropyran, dioxane and ethylene glycol diethylether may be used. However, a solvent containing an active hydrogen atom such as alcohols and amines is not suitable. What is an especially preferable solvent is a cyclic ether such as tetrahydrofuran and dioxane.

In this invention, in order to disperse in an aqueous solution of a saponifying agent, an oily substance or a solution of an aromatic dihalomethyl compound to form an oil-in-water type emulsion, it is, of course, possible to employ the conventional means heretofore used for the preparation of emulsions. However, in order to rapidly form an oil-in-water type emulsion preferable for the object of this invention, normal stirring is not enough, and it is preferable to carry out effective emulsification and dispersion by powerful mechanical stirring. The present inventors have found that saponification can be rapidly achieved by swiftly carrying out emulsification and dispersion by using as a powerful mechanical stirring apparatus, a ultrasonic variable frequencies system or a high-speed rotary emulsifying machine. The ultrasonic variable frequencies system as herein used is what converts a high frequency current to a ultrasonic vibration by an electro-mechanical converter with a view to bringing about emulsification and dispersion by utilizing its strong colliding effect. Frequencies effective for emulsification, and dispersion are from 15 to 30 kilocycles/second. And the high-speed rotary emulsifying machine is what is provided with a stirring part having a tough shearing effect, rotating a turbine at a high-speed, due to the shearing effect of which fine granulation of a dispersoid is brought about to effect emulsification and dispersion, and for the object of this invention, a high-speed rotation of from at least 2,000 r.p.m. to 10,000 r.p.m. is generally required. The oil-in-water type emulsion preferable in this invention does not mean an emulsion which is stable for lapse of time. An emulsion formed by said means easily separates into two layers of oil and water when mechanical stirring or ultrasonic vibration is discontinued.

It is of course possible to emulsify an oily substance or a solution of an aromatic dihalomethyl compound in an aqueous solution of a saponifying agent by the use of an emulsifying agent, and concurrent use with said mechanical stirring further accelerates emulsification and dispersion of said compound. However, use of an emulsifying agent results in troublesome operation for separation of the product after emulsification; therefore, use of an emulsifying agent is normally not advantageous.

Thus, according to this invention, by emulsifying an aromatic dihalomethyl compound in an aqueous solution of a saponifying agent, within a very short period and at a reaction temperature of below 100°C. without super-atmospheric pressure, saponification of said compound can be easily carried out. Because of this characteristics, the process of this invention is especially suitable for preparing continuously aromatic glycols by using a small reactor.

Please refer to the accompanying drawing for better understanding of this invention.

FIG. 1 is a block flow diagram briefly showing the continuous process of this invention.

In FIG. 1, roughly speaking, this continuous system comprises a preheater 1, a reactor 2, a decanter 3, a crystallizer 4, a drier 5, an extractor 6, a stripper 7 and a filter 8. A dihalomethyl compound fed from a conduit 11 is mixed with water and a saponifying agent (e.g., sodium carbonate) and preheated at the preheater 1. In the case of a dihalomethyl compound, e.g., 2,5-bis(chloromethyl)-p-xylene, requiring a solvent for accelerating a reaction, a solvent (e.g., dioxane) is fed from a conduit 14. The preheated mixture is introduced via a conduit 15 to the reactor 2 provided with a tough shearing stirrer or a ultrasonic transducer. After staying inside the reactor for 2 – 15 minutes, the reaction mixture enters via a conduit 16 into the decanter 3 and, as occasion demands, the unreacted dihalomethyl compound is separated by decantation. The separated dihalomethyl compound is returned via a conduit 17 to the preheater and again introduced to the reactor. When a solvent is used, the reaction mixture is introduced via a conduit 18 to the stripper 7 and after distilling off the solvent, the concentrate enters into the decanter. The reaction mixture free of the unreacted dihalomethyl compound enters into the crystallizer 4, left to stand to be cooled and a glycol crystallizes. In the case of using a saponifying agent hardly soluble in water such as calcium carbonate, the saponifying agent is once filtered by the filter 8, thereafter the reaction mixture is introduced into the crystallizer. The crystallized glycol is filtered and enters into the drier 5. The filtrate passes a conduit 24 and is mixed with sodium hydroxide fed from a conduit 25 (where the carbonate converted to a bicarbonate due to a saponification reaction returns to a carbonate by a neutralization reaction) and circulated to the preheater. When circulation is repeated and the filtrate wherein sodium chloride is accumulated is introduced via a conduit 26 into the extractor 6 and extracted with an extracting solvent (e.g., methyl isobutyl ketone) fed from a conduit 27. The extract enters into the stripper 7, where the extracting solvent is distilled off, and then crystallized glycol is introduced into the drier. From the drier, the desired aromatic glycol is obtained.

Of course, at this occasion it is possible to provide and use a plurality of reactors in a series and/or in parallel instead of carrying out a reaction in one reactor to increase the treating amount per unit time.

Next, this invention will be explained with reference to examples. These examples are for the explanatory purpose and this invention will not be limited thereby in any sense.

EXAMPLE 1

A glass four-necked flask provided with a reflux cooler and a thermometer was charged with 51 parts of 4,6-bis(chloromethyl)-m-xylene having a melting point of 98°C., 53 parts of anhydrous sodium carbonate and 1,700 parts of water, to which flask a high-speed rotary emulsifying machine ("Homomixer" manufactured by Tokushu Kika Kogyo Kabushiki Kaisha, Japan) was inserted so that a stirring part might be sufficiently immersed in the solution. The flask was heated to a temperature above 97°C. and when said 4,6-bis(chloromethyl)-m-xylene was completely melted, the Homomixer was operated to effect a tough shearing stirring of 9,000 r.p.m. to emulsify said oily substance in an aqueous solution of sodium carbonate and in this state the contents were reacted for 4 minutes. After cooling the reaction solution, the crystallized glycol was filtered and dried to obtain 36 parts of 4,6-dimethylol-m-xylene. Next, to the filtrate, methyl isobutyl ketone was added, the filtrate was extracted, and by distilling off the extracting agent from the extracted solution, the obtained crystals were dried. The obtained amount was 5 parts and the total obtained amount was 41 parts (98.7 percent of the theoretical amount). The melting point of said crystal was 146° to 147°C.

EXAMPLE 2

A glass four-necked flask provided with a reflux cooler and a thermometer was charged with 51 parts of 4,6-bis(chloromethyl)-m-xylene having a melting point of 98°C., 23 parts of calcium hydroxide and 1,000 parts of water, to which flask a nickel magnetostrictive transducer used in a ultrasonic Homogenizer [(registered Japanese trade mark) manufactured by Cho-Onpa Kogyo Kabushiki Kaisha, Japan] was inserted. The flask was heated to a temperature above 97°C. and the contents were irradiated with a ultrasonic vibration of a frequency of 17 kilocycles/sec. and an output of 500 watts for 5 minutes. After completion of the reaction, immediately the reaction solution was filtered to filter off the unreacted calcium hydroxide. After cooling, the crystallized glycol was filtered. On the other hand, the filtrate was extracted as in Example 1 and crystals were obtained. The obtained amount including both crystals was 40.5 parts (97.5 percent of the theoretical amount) and the melting point thereof was 146° to 147°C.

EXAMPLE 3

In Example 2, as a saponifying agent instead of calcium hydroxide, 26 parts of calcium carbonate were used and the reaction was carried out under the same conditions as in Example 1 for 5 minutes. After completion of the reaction, the reaction solution was immediately filtered to filter off the unreacted calcium carbonate. After cooling, the crystallized glycol was filtered and the filtrate was extracted same as in Example 1 to obtain crystals. The obtained amount including both crystals was 40.1 parts (96.4 percent of the theoretical amount) and the melting point thereof was 145° to 146°C.

EXAMPLE 4

The reactor used in Example 1 was charged with 80 parts of anhydrous sodium carbonate and 970 parts of water, further, 51 parts of 4,6-bis(chloromethyl)-m-xylene dissolved in 240 parts of acetone were added thereto. The reactor was heated to 65°C. and the contents were stirred with tough shearing at 9,000 r.p.m. to disperse the added solution into the aqueous solution thereby forming an emulsion and the reaction was carried out in this state for 5 minutes. The reaction temperature after completion of the reaction was 70°C. Immediately, said acetone was distilled off and the reaction solution was left to stand to be cooled. The crystallized glycol was filtered, while the filtrate was extracted with methyl isobutyl ketone and by distilling off the extracting agent from the extracted solution, crystals were obtained. The obtained amount of 4,6-dimethylol-m-xylene adding the filtered crystals to the extracted crystals was 41 parts (98.7 percent of the theoretical amount) and the melting point thereof was 146° to 147°C.

EXAMPLE 5

A glass four-necked flask provided with a reflux cooler, a thermometer and the Homomixer as used in Example 1 was charged with 53 parts of anhydrous sodium carbonate and 1,000 parts of water, further, 51 parts of 2,5-bis(chloromethyl)-p-xylene having a melting point of 134°C. dissolved in 200 parts of 1,4-dioxane were added thereto. The contents were heated to a temperature above 95°C. and stirred with tough shearing at 9,000 r.p.m. to disperse the added solution into the aqueous solution to form an emulsion and in this state a reaction was carried out for 5 minutes. Immediately, 1,4-dioxane was distilled off by boiling with water and the reaction solution was left to stand to be cooled. The crystallized glycol was filtered, while the filtrate was extracted with methyl isobutyl ketone and by distilling off the extracting agent from the extracted solution, crystals were obtained. The obtained amount of 2,5-dimethylol-p-xylene was 41 parts (98.7 percent of the theoretical amount) and the melting point thereof was 156° to 157°C.

EXAMPLE 6

The reactor used in Example 5 was charged with 52.5 parts of m-xylylene dichloride having a melting point of 34.5°C., 64 parts of anhydrous sodium carbonate, 500 parts of water and 200 parts of 1,4-dioxane. The reactor was heated to a temperature above 90°C., while stirring at 9,000 r.p.m. and in this state the contents were reacted for 5 minutes. Immediately, 1,4-dioxane was distilled off by boiling with water and the reaction solution was concentrated. Because m-xylylene glycol is easily soluble in water, it was extracted from the concentrated solution with methyl isobutyl ketone. The obtained amount of m-xylylene glycol was 41.0 part (99.0 percent of the theoretical amount) and the melting point thereof was 55.5° to 56.7°C.

EXAMPLE 7

The reactor used in Example 5 was charged with, in sequence, 52 parts of p-xylylene dichloride having a melting point of 99° to 100°C., 200 parts of tetrahydrofuran, 500 parts of water and 70 parts of anhydrous sodium carbonate, and the reactor was heated. When the temperature exceeded 85°C., the Homomixer was operated at 9,000 r.p.m., in this state, the contents were reacted for 3 minutes, thereafter, tetrahydrofuran was immediately distilled off, followed by concentration of the reaction solution. Because p-xylylene glycol is easily soluble in water, it was extracted from the concentrated solution with methyl isobutyl ketone. The obtained amount of p-xylylene glycol was 38 parts (92.7 percent of the theoretical amount) and the melting point thereof was 115° to 116°C.

EXAMPLE 8

A glass four-necked flask provided with a reflux cooler and a thermometer was charged with 7 parts of bis(chloromethyl)durene having a melting point of 194°C. and 50 parts of 1,4-dioxane, and the contents were heated to be dissolved, to which solution 3 parts of caustic soda dissolved in 100 parts of water were added. An ultrasonic transducer was inserted into the mixed solution, which solution was heated to a temperature above 95°C. and while a ultrasonic vibration of a frequency of 25 kiloxycles/sec. and an output of 150 watts was irridiated to the solution and the reaction was carried out for 15 minutes. After completion of the reaction, immediately 1,4-dioxane was distilled off by boiling with water and the reaction solution was left to stand to be cooled. The crystallized glycol was filtered, while the filtrate was extracted with methyl isobutyl ketone. From the extracted solution, the extracting agent was distilled off to obtain crystals. The total amount of resulting dimethylol durene was 5.6 parts (96.5 percent of the theoretical amount) and the melting point thereof was 245° to 246°C.

What is claimed is:

1. In a process for the preparation of aromatic glycols which comprises saponifying a dihalomethyl compound having the general formula

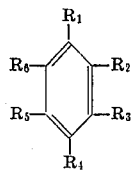

wherein each of $R_1$, $R_2$, $R_3$, $R_4$, $R_5$ and $R_6$ is a group selected from the class consisting of hydrogen, an alkyl group having one to two carbon atoms and a halomethyl group provided that two groups of the total are halomethyl groups, with an aqueous alkaline solution, the improvement which comprises dispersing a water-soluble organic solvent solution of said dihalomethyl compound, in which said water-soluble organic solvent is selected from the group consisting of a water-soluble cyclic ether and a water-soluble ketone, into an aqueous solution of a saponifying agent selected from the group consisting of a hydroxide of an alkali metal, a carbonate of an alkaline earth metal with a tough shearing stirring of 2,000 to 10,000 r.p.m. at a temperature of from room temperature to 100°C. for a period of at most 15 minutes to form an oil-in-water type emulsion, and recovering the resultant aromatic glycol corresponding to said dihalomethyl compound.

2. A process according to claim 1, wherein said solution of said aromatic hydrocarbon dihalomethyl compound is dispersed into said aqueous solution at a temperature of from 50° to 100°C.

3. A process according to claim 1, wherein said aromatic hydrocarbon dihalomethyl compound is a compound selected from the group consisting of m-xylylene dichloride, p-xylylene dichloride, 4,6-bis(chloromethyl)-m-xylene and 2,5-bis(chloromethyl)-p-xylene.

4. A process according to claim 1, wherein said aqueous solution of a saponifying agent has a concentration of 0.01 to 0.4 gram equivalent of the saponifying agent per 100 grams of water.

5. In a process for the preparation of aromatic glycols which comprises saponifying 4,6-(bis(chloromethyl)-m-xylene with an aqueous alkaline solution, the improvement which comprises heating 4,6-bis(chloromethyl)-m-xylene at a temperature from 95° to 100°C. to melt said compound, dispersing the said oily compound into an aqueous solution or dispersion of a saponifying agent selected from the group consisting of a hydroxide of an alkali metal, a carbonate of an alkali metal, a hydroxide of an alkaline earth metal and a carbonate of an alkaline earth metal with a tough shearing stirring of 2,000 to 10,000 r.p.m. for a period of at most 15 minutes to form an oil-in-water type emulsion, and recovering the resultant 4,6-bis(hydroxymethyl)-m-xylene.

* * * * *